United States Patent [19]
Williamson

[11] Patent Number: 5,513,088
[45] Date of Patent: Apr. 30, 1996

[54] UNINTERRUPTABLE OFF-LINE, ISOLATED FLYBACK TOPOLOGY SWITCH-MODE POWER SUPPLY

[76] Inventor: Floyd Williamson, 312 Autumn La., Madison, Ala. 35758

[21] Appl. No.: 312,168

[22] Filed: Sep. 26, 1994

Related U.S. Application Data

[63] Continuation of Ser. No. 261,082, Jun. 13, 1994, abandoned, which is a continuation of Ser. No. 76,057, Jun. 14, 1993, abandoned, which is a continuation of Ser. No. 895,232, Jun. 8, 1992, abandoned, which is a continuation of Ser. No. 715,824, Jun. 14, 1991.

[51] Int. Cl.⁶ .................................................. H02M 3/335
[52] U.S. Cl. .................................................. 363/20; 363/21
[58] Field of Search .............................. 363/21, 25, 49, 363/56, 97, 131, 20

[56] References Cited

U.S. PATENT DOCUMENTS

| | | | |
|---|---|---|---|
| 3,697,854 | 10/1972 | Berger . | |
| 4,184,197 | 1/1980 | Cuk et al. | 363/16 |
| 4,313,060 | 1/1982 | Fickenscher et al. | 363/25 X |
| 4,316,242 | 2/1982 | Colangelo et al. | 363/21 |
| 4,459,651 | 7/1984 | Fenter | 363/21 |
| 4,481,564 | 11/1984 | Balaban | 363/21 |
| 4,504,775 | 3/1985 | Becker | 363/19 X |
| 4,561,046 | 12/1985 | Kuster | 363/21 |
| 4,581,690 | 4/1986 | Russell | 363/17 |
| 4,608,625 | 8/1986 | Josephson et al. | 363/21 |
| 4,686,616 | 8/1987 | Williamson | 363/21 |
| 4,688,158 | 8/1987 | Peterson et al. | 363/21 |
| 4,709,318 | 11/1987 | Gephart et al. . | |
| 4,745,538 | 5/1988 | Cross et al. | 363/21 |
| 4,760,324 | 7/1988 | Underhill . | |
| 4,870,553 | 9/1989 | Brown | 363/16 |
| 4,890,217 | 12/1989 | Conway | 363/21 X |

*Primary Examiner*—Peter S. Wong
*Assistant Examiner*—E. Tso
*Attorney, Agent, or Firm*—Lowe, Price, LeBlanc & Becker

[57] ABSTRACT

An all-ranging DC output uninterruptible switched mode power supply (SMPS) of off-line flyback topology is capable of operating with an input voltage between 90 v AC and 270 v AC and an input frequency range of 40 Hz–70 Hz for operation throughout the world. Provided with a battery backup, the SMPS gives DC output without interruption even during AC power failures. The battery and the regulated AC main's supply outlet are connected through an "OR" connection comprising Shortsky rectifier diodes. A pulse width modulator whose conductive duty cycle is responsive to the condition of a voltage, Vcc, provides a reference voltage. An isolated flyback converter includes MOSFET transistor switch and power transformer. The power transformer stores energy in its primary winding when transistor is conductive and transfers energy to the secondary winding when transistor is nonconductive. The pulse width modulator controls the conduction of the transistor. A snubber circuit allows slow decay of current in the power transformer. An opto-coupler acts as a feedback or the pulse width modulator. Inductor is used for storing energy and transferring energy to the negative voltage regulator when control IC, is off, to provide −12 v at the output of negative voltage regulator.

3 Claims, 1 Drawing Sheet

UNINTERRUPTABLE OFF-LINE, ISOLATED FLYBACK TOPOLOGY SWITCH-MODE POWER SUPPLY

This application is a continuation of Application Ser. No. 08/261,082 filed Jun. 13 1994 now abandoned, which is a continuation of Application Ser. No. 08/076,057, filed Jun. 14, 1993, now abandoned, which is a continuation of Application Ser. No. 07/895,232, filed Jun. 8, 1992, now abandoned, which is a continuation of Ser. No. 07/715,824, filed Jun. 14, 1991.

BACKGROUND OF THE INVENTION

In general, the present invention relates to power supplies and more specifically to an all-ranging DC output uninterruptible switched mode power supply of off-line flyback topology capable of operating with an input voltage between 90 v AC and 270 v AC and an input frequency range of 40 Hz–70 Hz for operation throughout the world.

The prior art in this area has suffered from a number of shortcomings and difficulties as set forth in—U.S. Pat. No. 4,686,616.

The general State of the art is set forth in—

Horowitz and Hill, *The Art of Electronics*, 2nd Ed., Cambridge University Press, New York, N.Y., 1989, pp. 307–391, n.b. 357, 374.

Of particular interest:

U.S. Pat. No. 3,697,854
U.S. Pat. No. 4,184,197
U.S. Pat. No. 4,745,538
U.S. Pat. No. 4,870,553.

Further patents of interest are:

U.S. Pat. No. 4,313,060 U.S. Pat. No. 4,561,046
U.S. Pat. No. 4,316,242 U.S. Pat. No. 4,581,690
U.S. Pat. No. 4,459,651 U.S. Pat. No. 4,608,625
U.S. Pat. No. 4,481,564 U.S. Pat. No. 4,688,158
U.S. Pat. No. 4,504,775 U.S. Pat. No. 4,890,217.

SUMMARY OF THE INVENTION

Accordingly, it is an object of the present invention to provide a new, highly effective power supply and method for supplying power which overcomes the deficiencies of the prior art as reflected in the prior art set forth above.

It is a further object of the present invention to provide a power supply for operation with a wide range of input variations that derives the control circuit's power from the switching transformer's counter-electromotive force.

Another object of the present invention is to produce a simpler, lower cost and more efficient power supply.

Other objects and a fuller understanding of the present invention may be obtained by a detailed consideration of the prior art set forth above. For example as disclosed in U.S. Pat. No. 4,686,616 it is known to utilize a start-up transformer to generate needed power. The thrust of such designs may be seen to overcome the many problems associated with using a start-up transformer with very wide input power ranges.

Other designs have replaced the start-up transformer by utilizing an auxiliary winding on the switching transformer but such an approach complicates the overall design of the power supply and introduces a new complexity to the switching transformer related to product safety.

Still other objects and a fuller understanding of the present invention may be obtained by referring to the following description and claims taken in conjunction with the accompanying drawings.

The present invention overcomes some of the problems noted in the prior art by providing an all-ranging DC output uninterruptable switched mode power supply of off-line isolated flyback topology. This switched mode power supply comprises a switched mode power supply means including a transformer having primary and secondary windings and an isolated flyback converter including a main power switch. The transformer stores energy in its primary when the switch is conductive and transfers energy to the secondary winding of the transformer when non-conductive. Output filter means rectify and filter the transformer output pulses to produce DC voltages. The power supply has a pulse-width modulated control circuit means to sense the output voltage level and adjust the duty cycle of the power switch to control the output voltage by accepting feedback from the output, comparing the feedback to a set point and generating an error signal which provides the basis for modulating the width of the output pulse by adjusting the conduction time of the power switch. The pulse-width modulated control signal start-up circuit comprises a resistor and first and second capacitors, with a start-up time delay being a function of an RC time constant formed by a resistance of the resistor and a capacitance of the second capacitor. Snubber circuit means permit the slow decay of current in the transformer, this snubber circuit means including the second capacitor which stores sufficient energy to power the pulse-width modulated control circuit when charged by current from the transformer during a flyback period of the transformer. The capacitance of the second capacitor is at least ten times greater than the capacitance of the first capacitor such that the second capacitor stores the sufficient energy. The capacitance of the second capacitor is such that the start-up time delay is maintained at a reasonable value.

In certain embodiments of the invention, a capacitance of the first capacitor is approximately 20 μF and the capacitance of the second capacitor is approximately 470 μF. In certain embodiments, the resistance of the resistor is approximately 47 K ohms.

The present invention overcomes many of the deficiencies of the prior art and achieves its objectives by providing a stable array of DC output voltages with large variations of input voltage and frequency. A key advantage of the present invention is found in the utilization of the energy that would normally be lost in the snubber circuit to supply power to the control circuitry of the power supply. This power is utilized so as to permit a rearranging of the components of the conventional snubber circuit thus eliminating the customary start-up transformer and linear power supply circuitry or the auxiliary winding on the power transformer and its associated circuitry. The present invention is thus an improvement over current methods of generating the operating power for off-line switching power supply control circuits in that it may be produced at reduced cost and with less complexity. The present invention makes it much easier to provide the needed operating power for a primary (main connected) pulse-width modulator control circuit whether or not the power supply is operating with wide ranging inputs. The present invention also is a major advancement for the designing of off-line switching power supplies that are specifically designed to operate anywhere in the world on commercially available power. The approach of the present invention also simplifies the construction of the switching transformer and reduces the product safety concerns. A further advantage of the present invention is that the power developed is self regulating to the AC (mains) voltage and PWM duty-cycle thus providing an inherent undervoltage protection.

In summary, the present invention is directed to an all-ranging DC output uninterruptible switched mode power supply (SMPS) of off-line flyback topology which is capable of operating with an input voltage between 90 v AC and 270 v AC and an input frequency range of 40 Hz–70 Hz for operation throughout the world. Provided with a battery backup, the SMPS gives DC output without interruption even during AC power failures. The battery and the regulated AC main's supply outlet are connected through an "OR" connection comprising Schottsky rectifier diodes. A pulse width modulator, whose conductive duty cycle is responsive to the condition of a voltage, Vcc, provides a reference voltage. An isolated flyback converter includes a MOSFET transistor switch and a power transformer. The power transformer stores energy in its primary winding when the MOSFET transistor is conductive and transfers energy to the secondary winding when the MOSFET transistor is nonconductive. The pulse width modulator controls the conduction of the MOSFET transistor. A snubber circuit allows slow decay of current in the power transformer. An opto-coupler acts as a feedback means for the pulse width modulator. An inductor is used for storing energy and transferring energy to a negative voltage regulator when a control IC, is off, to provide a negative output at the output of negative voltage regulator U202.

BRIEF DESCRIPTION OF THE DRAWINGS

In order to facilitate the understanding of the present invention, reference will now be made to the appended drawings of preferred embodiments of the present invention. The drawings should not be construed as limiting the invention, but are exemplary only. In the drawings.

DESCRIPTION OF THE PREFERRED EMBODIMENTS OF THE PRESENT INVENTION

Figure 1:
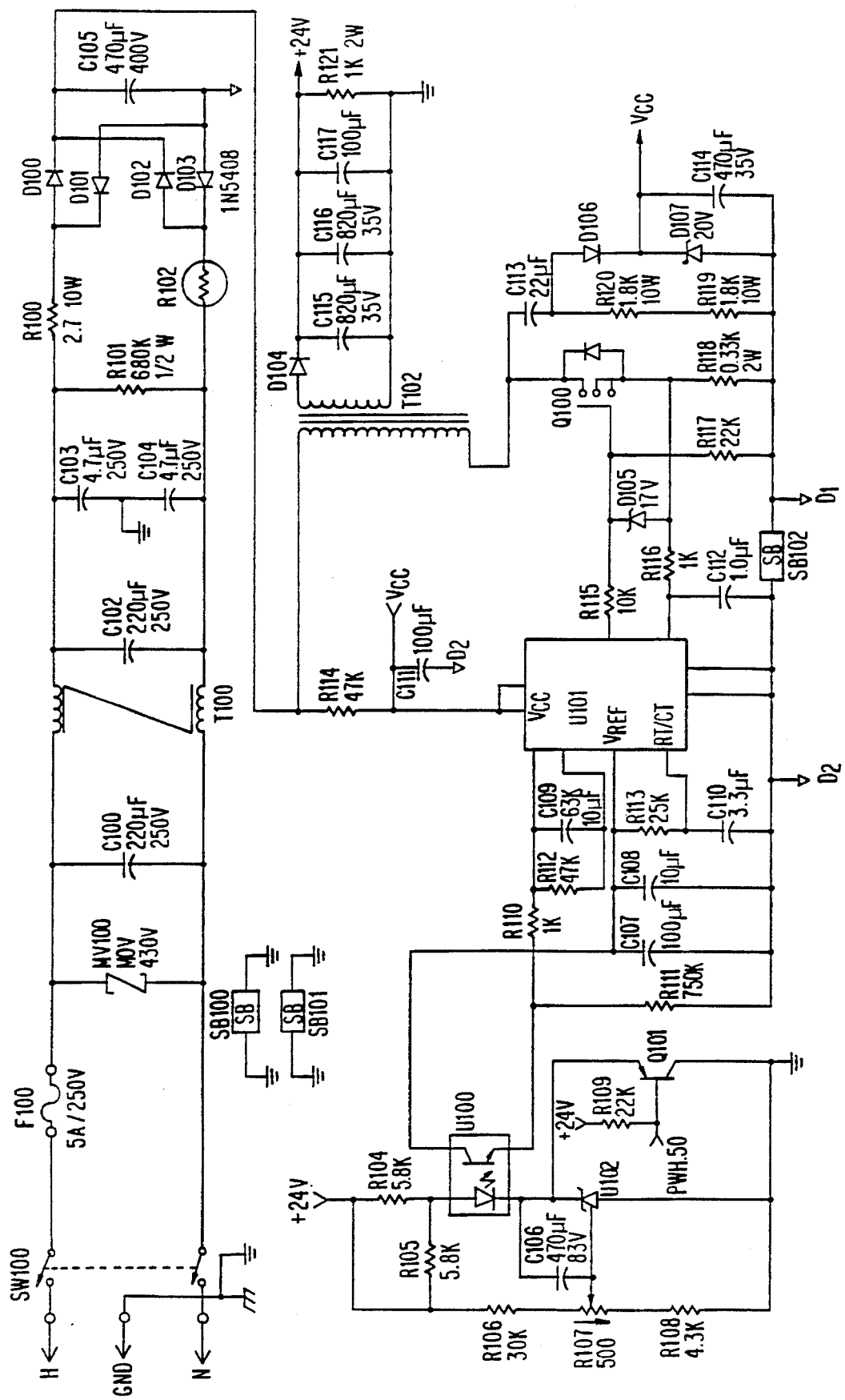
FIG. 1 is a schematic diagram of an embodiment of the present invention.

A preferred embodiment of the present invention shown in FIG. is a DC output uninterruptible power supply of an off-line "flyback" topology switching power supply capable of operating with an input voltage ratio of 3:1 (90 VAC–270 VAC) and an input frequency range of 40 Hz to 70 Hz. The power supply is designed to operate through-out the world including areas with poorly regulated mains power.

Installation of the power supply requires only the proper selection of the line cord to match the available power outlet. The power supply will provide continuous reliable operation over the specified voltage range of 90 VAC to 250 VAC in a temperature environment of 0° C. to 65° C.

The unit is designed to meet U/L 478, CSA C22.2 #154, and IEC 950 requirements up to the safety limit of 250 VAC. The unit is designed to meet the ANSI/IEEE Std. C62.41 (formerly IEEE 587) specifications for line transient and surge conditions. The power supply will meet the limits for conducted radiation for Class A equipment as set by the FCC and VDE agencies.

The main supply voltage (+24 VDC) is regulated by the mains (primary) connected Switched-Mode Power Supply (SMPS) with a primary side Pulse-width Modulator (PWM) controller. Proprietary circuitry utilizes power for PWM operation that would normally be lost in the flyback snubber circuitry. This circuit reduces the cost and parts count by eliminating the customary start-up transformer or switching transformer auxiliary winding and the associated circuits. The circuitry also provides inherent reliable undervoltage protection since the PWM operating power is derived directly from the operation of the SMPS.

The main PWM is a current-mode type controller with a guaranteed maximum 50% duty-cycle. The PWM has an undervoltage lock-out feature and a built-in delay to protect the main switcher from erratic power fluctuations during power-on conditions. The current-mode PWM operation provides inherent current limit operation and feed forward compensation for AC mains voltage variations.

Two SMPS post-regulators are used to provide the +5 VDC and +12 VDC outputs. The +5 VDC and +12 VDC operate from the +24 VDC which is backed-up by three +6 VDC batteries connected in series. The battery voltage and the +24 VDC are connected by a diode 'OR' to provide the Power BUS voltage (PBUS) for continuous operation of the +5 VDC and +12 VDC with no transfer time. The +12 VDC output is derived from the +5 VDC regulator inductor and has a linear post-regulator. Each output is protected form over-voltage, under-voltage, over-current, and short-circuit operation.

A battery charger circuit is provided that maintains the batteries at optimum charge levels. Three levels of charge current are provided to the batteries depending upon the level of charge/discharge on the batteries. The charge current levels are temperature compensated to properly match the varying requirements of the batteries as the ambient temperature varies. The charge circuit operates from the +24 VDC.

Control/supervisory circuit is provided to monitor the operation of the power supply and to take appropriate action during fault conditions. The PBUS is fused and controlled by an internal relay. The diode 'OR' feature of the PBUS allows the connection of multiple external power supplies to extend the battery back-up time. A DC switch is provided for maintenance personnel to shutdown the power supply.

In a preferred embodiment, the physical design of the power supply enhances the product reliability by incorporating the design on one smaller double-sided board that is specifically designed for maximum automatic assembly. The design includes surface mount (SMT) components for most low power devices. Reliability is enhanced by the elimination of interconnect wiring between multiple boards. The overall process will result in reduced handling, higher production yields, and less ESD damage.

Referring now to the embodiment of FIG. 1, AC mains power is applied to the AC receptacle/switch assembly SW100. A chassis ground connection from the metal enclosure is made to the AC receptacle ground through a PEM stud connection. The resistance of the connection between the earth grounding terminal and earth ground cannot exceed 0.1 Ω as defined by the IEC. A ground continuity test applies 25 amperes across the connection and the measured voltage cannot exceed 2.5 V. The IEC standards also specify that the conductive components used for the earth grounding shall not be subject to significant corrosion due to electro-chemical action between the conductive components. Care must be taken to ensure that compatible metals are used for the earth grounding components per IEC 950 Appendix K. Production units are required to pass a hipot test of 3750 VAC rms and a ground continuity test.

A ferrite bead (not shown in FIG. 1) is attached between the chassis ground and the AC receptacle ground. This ferrite bead is used as a lossy filter to suppress common-mode noise from the metal enclosure. SB100 and SB101 are smt ferrite beads used to suppress EMI between earth ground, chassis ground, and the circuit grounds. The beads also allow control of pcb foil routing to prevent ground loops and minimize crosstalk interference in sensitive circuits.

F100 is an IEC type 5 mm×20 mm time-delayed fuse rated for 5 amperes at 250 VAC. F100 is not a user replaceable fuse and the power supply must normally be returned to Depot Maintenance for repair. MV100 is a zinc-oxide nonlinear resistance (varistor) for bilateral surge suppression for power line disturbances (PLD). MV100 is a U/L recognized component. The peak varistor voltage range is 387 V to 473 V and is rated for operation at 275 VAC rms or 350 VDC. The surge life of these devices is dependent upon the amplitude and frequency of the PLD/s encountered. The device is rated for 8/20 uS pulses per the ANSI C62.41 standard as follows: (1) 10,000 pulses at 75 amperes; or (2) 100,000 pulses at 45 amperes. The PS is designed for operation in location categories Class A and B per the ANSI C62.41 standard which implies that the expected peak mains transient voltage is 6 KV. The Electro-magnetic interference (EMI) filter circuit must withstand the transient surge until the varistor clamps the voltage at a safe limit.

C100, C102, T100, C103, C104, and R101 form the EMI filter. The design of the EMI filter is set to meet VDE Class A plus a 5 dB safety margin. C100 and C102 are IEC type 'X' capacitors for across the line operation. C100 which will take the brunt of the PLD must be an X1 type or be an X2 type with SEMKO and DEMKO approval (meets the X1 surge voltage requirements). C102 is an X2 type. T100 is a 2.2 mH common-mode line choke designed to reduce line conducted EMI above 10 KHz and also acts as a 60 uH differential filter.

T100 is rated for 2 amperes rms continuous current; complies with U/L and VDE spacing requirements and is designed to pass a 3750VAC rms hipot. C103 and C104 are IEC 'Y' capacitors that complete the EMI filter. The value of the Y capacitors and the stray capacitances distributed throughout the power supply allow a leakage current to flow through the ground wire back to earth ground. This leakage current could flow through a person's body if the grounding of the unit was lost. The maximum limit for ground leakage current for this application is set by IEC 950 standards at 3.5 mA. Metallized film capacitors were selected for C100, C102, C103, and C104 because of their inherent self-healing property versus applied voltage. Ceramic X and Y capacitors are not to be used in this application. In addition to the IEC safety requirements, the X and Y capacitors should comply with U/L 1414 flammability requirements. R101 is provided to ensure that the X and Y capacitors are discharged within 60 seconds after power is removed or the fuse blows.

R100 and R102 form an inrush current limit circuit. R102 is a negative temperature coefficient (NTC) resistor or thermistor that limits the inrush current. R102 works on the principle that the thermal time constant of the thermistor is longer than the electrical time constant of the thermistor and filter capacitor (C105). R100 sets the maximum inrush current to safe limits for the very rare condition of power being restored when R102 is still thermally hot. The use of the thermistor is justified by the decreased stress on the AC switch, fuse, input diodes and filter capacitor for the vast majority of the power on/off cycles (cold starts). R102 is a 10 Watt resistor that is derated 50% from maximum rated power under worst-case operation to minimize the associated pcb heating.

D100, D101, D102, D103, and C105 form a full-wave bridge and filter circuit. The diodes are 1000 V 3 A general purpose diodes. C105 was selected to provide the required hold-up time for the SMPS (20 mS @115 VAC) and to meet the required voltage rating (400 VDC) and minimum ripple current rating (3.2 A at 65° C., 120 Hz).

R114, C111, C114 and D107 serve as the start-up circuit for the PWM (U101). C114 is charged via R114 until the threshold voltage of the PWM (+16 VDC) is reached and the PWM begins operation. The start-up time delay for the PS is dependent upon the value of the AC mains voltage and the RC time constant of R114 and C114. The value of R114 is critical because of the large 3:1 range of AC voltage and the maximum acceptable time delay. R114 is a 5 Watt resistor that is derated approximately 50 % from maximum rated power under worst-case operation to minimize the associated pcb heating. The value of C114 is very critical to the overall operation of the start-up circuit and the operating power for the PWM which will be described later. The minimum ripple current rating of C114 is 0.5 amperes at 85° C., 120 Hz. D107 is a zener diode that would limit the voltage on C114 to 20 VDC during a fault condition. Normal operating voltage on C114 is between +10 VDC and +16 VDC. C111 is a high frequency bypass capacitor for the PWM U101. R114 and D107 also serve to discharge the main filter capacitor C105 when power is removed.

The basic topology of the SMPS is an isolated flyback converter circuit. The SMPS power stage basically comprises of the power switch Q100, current sense resistor R118, power transformer T102, secondary diode D104, and output capacitors C115 and C116. The operation of the flyback begins when Q100 turns on and current begins to flow in the primary of T102 but because of the T102 winding configuration D104 is reversed biased and no current flows into the secondary circuit. Since energy is not being transferred to the secondary the energy must be stored in the transformer T102. When Q100 is turned off the primary inductance opposes the change in current and a CEMF (counterelectromotive force) is generated that forward biases D104 and the stored energy is transferred to the secondary. The PWM controls the on/off time of Q100 to regulate the amount of energy stored to maintain the output voltage for changes in the AC mains voltage and load changes.

It is interesting to note that the flyback transformer is more accurately described as an isolated inductor since it stores energy. One advantage of a flyback SMPS is the elimination of the secondary inductor since the transformer serves as the inductor when Q100 turns off. Although all SMPS generate higher ripple voltage than linear PS's it should be noted that a flyback SMPS produces more noise than other switching topologies. The higher ripple voltage is due in part to the higher peak secondary currents.

There are two modes of operation possible in the flyback: (1) Complete energy transfer or discontinuous mode; and (2) Incomplete energy transfer or continuous mode. In discontinuous mode all of the energy stored in the transformer T102 is transferred to the secondary during the off period. With continuous mode operation only part of the energy that was stored gets transferred to the secondary.

During the energy storage phase the primary appears as a single inductor. The rate of change in primary current per time is directly proportional to the applied voltage and indirectly proportional to the primary inductance value. During an On period the flux density will increase from the residual value to the peak working value. During the Off period D104 will conduct and all of the magnetizing energy will now transfer to the secondary. The flux density will return to the residual flux density value.

Given the very wide variations of line and load conditions the flyback of the present invention will have to be able to operate in either continuous or discontinuous mode. In this application the only time that the PS will operate in continuous mode is during abnormal conditions of line and load. Unipolar utilization of the transformer is also a minor disadvantage of the flyback topology and results in a slightly larger core volume. A view of the energy stored in the transformer versus the core losses is depicted in FIG. ∈. As mentioned, when Q100 turns off the primary inductance produces a CEMF that causes a dv/dt voltage stress on Q100. The peak power losses in the switching device are shown in FIG. 9 directly related to the rate of rise of the voltage on the switching device.

In addition to this stress the leakage inductance of T102 also produces a more serious voltage stress that is only limited by the leakage inductance value which is not easily controlled. In the flyback transformer, current is built up in the primary winding to store energy in the magnetic field. When this current is turned off the mutual inductance between the windings causes the current to transfer to the other winding. The same ampere-turns must continue to flow to maintain the energy in the mutual fields. However, the flux lines associated with the relatively small energy being stored between the primary and secondary is only linked to the outer winding. The leakage inductance associated with this energy tries to maintain the current in the secondary winding. The result is a large reverse voltage swing which forces the leakage inductance energy to be absorbed by the primary circuitry. The leakage inductance is proportional to the number of turns and the volume of space between the windings. It is very difficult to maintain a minimum amount of space between the windings and meet all of the safety creepage and clearance specifications. The leakage inductance energy must be controlled to prevent excessive voltage from being applied to Q100. A turn-off snubber circuit is incorporated to protect Q100.

The snubber consists of C113, C114, R119, R120, and D106. When Q100 turns off the inductor current begins to flow through C113, D106, and C114 which allows the current in T102 to decay more slowly. The rate that the current is allowed to decay is determined by the amount of charge on C113 and the CEMF generated by T102. R119 and R120 discharge C113 and determine the amount of charge maintained on C113.

In a flyback SMPS designed for such a large AC mains swing the values of C113, R119, and R120 are very critical and must be balanced between all extremes, such as, minimum and maximum load and line conditions. The large value of C114 compared to the value of C113 means that C114 is transparent to the snubber circuit and does not impact the basic operation directly. C113 is a 630 V film capacitor that is very critical to the reliable operation of the PS. D106 is a 1000 V 1 A diode with an ultrafast forward and reverse recovery time. R119 and R120 are derated by more than 50% from maximum rated power under worst-case operation to minimize the associated pcb heating. The resistors are also over-sized to allow the use of more widely available values.

The snubber circuitry also serves the function of providing the power stage's operating power from the energy that would normally just be lost in the snubber. As previously discussed the voltage on C114 is critical to proper operation of the PWM. When current is flowing through C113 and D106, C114 is recharged to maintain VCC above the necessary +10 VDC. The capacitance ratio between C113 and C114 is critical to ensure that sufficient energy is stored in C114. But it is also critical that the value of C114 be relatively small to keep the start-up time delay, which is set by the RC time constant of R114 and C114, reasonable.

The proprietary features of the PWM power circuit is in the use of the snubber to generate the necessary power to operate; ease of designing an all-ranging PS; and the reduced complexity and parts count. This circuit uses components that are normally part of the start-up circuit (R114, C144, and D107) and by relocating C114, into the snubber circuit, eliminates the need for any auxiliary PS circuits.

In preferred embodiments U101 is a UC3844D current-mode PWM controller designed for off-line SMPS operation in an SO-14 package. The UC3844D includes automatic feedforward compensation, pulse-by-pulse current limiting, and maximum 50% duty-cycle operation. The 50% limit in conjunction with the turns ratio of T102 and other factors ensures that reliable operation can be guaranteed over a large but controlled range of AC mains voltage.

The UC3844D has an under voltage (UV lock-out threshold of +16 VDC and an (UV) shutdown threshold of +10 VDC. U101 is held off until the voltage (VCC) on C114 reaches approximately +16 VDC and then begins operation and remains in operation until VCC drops to approximately +10 VDC. The PWM turns the internal bias voltage (referred to on the Block diagram as VREF) on and off depending upon the condition of VCC. This operating voltage is filtered by C108 and C107. This voltage is used for the timing components R113 and C110 and the feedback opto-coupler U100.

When the PWM UV threshold is reached, the oscillator begins operation and the frequency of operation is determined by the values of R113 and C110. The operating frequency is approximately 31.5 KHz. At the beginning of a cycle the oscillator will set an S/R latch of the PWM and the current sense comparator will terminate the cycle by resetting the PWM S/R latch based upon the error signals present. The toggle flip-flop is used to limit the duty-cycle to every other clock cycle (50% duty-cycle). The presence of the toggle flip-flop requires that the oscillator frequency be twice the desired operating frequency.

The output (pin 10) is connected to Q100 via R115 which limits the peak gate drive current to safe levels. When the output pin is high, Q100 is turned-on and conduction begins in the primary of T102. The output remains high and Q100 conducts until one of the following occurs: 1. The current limit threshold is reached; 2. The error signal threshold is reached; or 3. An under voltage condition occurs on VCC and the PWM shuts down. Once the output goes low it will remain low until the oscillator initiates a new cycle.

One immediate advantage of current-mode control is an input feedforward characteristic that occurs because the control circuit automatically corrects for input voltage changes, because of the resulting change in the slope of the primary current, without using up the error amplifier's dynamic range. The result is excellent line regulation and improved dynamic load regulation. An additional advantage is the pulse-by-pulse current limiting which is provided by the one volt current limit threshold of U101 and the value of the sense resistor R115. R118 sets the peak current threshold at approximately 3.3 amperes. R116 and C112 provide a low-pass filter to remove any switching transients present on the signal.

SB101 is a SMT ferrite bead used to suppress EMI and isolate the U101 circuit ground and the ground of the power stage.

Voltage feedback is made through the opto-coupler U100. U100 is a MOC8104T opto-coupler, in a special 8 mm IEC spaced 6-pin DIP package, that was specifically designed for off-line PS applications. The device exhibits a very closely matched current transfer ratio (CTR) that is linear and stable over its' temperature range while meeting the IEC creepage and clearance requirements. The input diode is driven by U102 which is configured as a transconductance amplifier. U102 is a TL431CD adjustable precision shunt regulator, in an SO-8 package, selected to establish a very stable temperature-compensated voltage reference. The transconductance amplifier translates changes in voltage to changes in current flow. U102 therefore regulates the current flowing through the opto-coupler's diode. U100's output transistor is connected as an emitter-follower to take advantage of that configuration's high current gain and near-unity voltage gain. Using an opto-coupler for feedback provides excellent isolation, reduces circuit complexity, and reduces cost. The biggest challenge to using standard opto-couplers has been the very wide unit to unit variations in the CTR, noise susceptibility, and long-term gain stability. The CTR variations made controlling the closed-loop gain very difficult but the MOC8100 series has addressed these problems. The gain of the variations in the opto-coupler due to temperature and aging. A block diagram of the TL431 is given in FIG. 17.

R111 and U100's transistor form the primary-side of the feedback circuit for the PWM. An error signal voltage is produced that is in proportion to the current flowing in the opto-coupler transistor. The voltage developed across R111 is set to be +2.5 VDC when the output voltage is +24 VDC. The 2.5 VDC error voltage level is set by the internal reference voltage of the UC101.

The combination of U102, R104, R105, R106, R107, R108, C106 and U100's diode form the secondary-side of the feedback circuit. R104 and R105 set the maximum current for U100. R106, R107, and R108 allow the feedback circuit to be adjusted to compensate for all circuit variations. C106 stabilizes the operation of the TL431 by limiting the transient response to a desired level. Q101 and R109 are part of the +24 VDC over-voltage shutdown circuit that will be discussed later. When Q101 is turned-on it will bypass U102 and force the current in the U100 diode to the maximum set by R104 and R105. The feedback voltage on R111 will exceed the error voltage level and the PWM will foldback the output.

The main switching device Q100 is an STHV82 800V N-channel enhanced mode Power MOSFET rated for 5.5 amperes and a specified 2 Ω maximum RDS(on) in a TO-218 package. A MOSFET was selected for this application to take full advantage of the overall lower cost and circuit simplicity possible with using a primary-sided PWM and power MOSFET. In a flyback designed for such a wide AC line variation the main switching device sees different stress levels depending upon the varying line and load conditions. At low line and maximum load the device sees peak current and maximum duty-cycle. At high line and minimum load the device sees very high voltage stresses. In similar designs using bipolar transistors it is difficult to maintain adequate base drive current at low line without expensive auxiliary PS's and complicated base drive circuits. Being a voltage driven device the power MOSFET simplifies the drive requirements and allows a primary-sided PWM to drive the device directly. At high line and minimum load a bipolar device can cause instability when the storage time approaches the minimum duty-cycle time. This storage time limitation is worst at elevated temperatures. This storage time limitation, of several microseconds, is related to the fact that bipolar transistors are minority-carrier devices that require a recombination time that limits the operating speed. The MOSFET overcomes this problem since MOSFET's are majority-carrier semiconductors and do not have a charge-storage mechanism. Another subtle advantage of the MOSFET is that hot spots do not attempt to form on the die because the device has a positive temperature coefficient of resistance so current tends to spread out. Since the MOSFET does not form hotspots the devices do not exhibit secondary breakdown. Of course the exact opposite is true with bipolar transistors especially as temperatures increase. The last major advantage of the MOSFET is the ease of interpreting the SOA characteristics. Once the pulsed current, maximum drain voltage, and maximum junction temperature are verified, reliable operation can be assured. Whereas with bipolar transistors, the RBSOA characteristics vary with junction temperature, base drive, duty-cycle, and various other derating parameters to the point that excess derating is required to ensure reliable operation. The capacitors form a capacitor divider that can induce a destructive voltage transient (greater than +/−20 V) on the gate from a rapidly rising voltage transient on the drain. D105 is a 17 V zener diode that acts as a voltage clamp for the gate which protects against positive or negative transients. R117 is a parallel dampening resistor that suppresses any parasitic oscillations in the gate-source loop and also provides a sink for output leakage currents when the under-voltage lockout is active. R105 also acts as a series dampening resistor to suppress parasitic oscillations in the gate drive circuit loop.

D104, C115, C116, C117, and R121 form the secondary rectification and filter circuit for the +24 VDC output. D104 is a 16A 400 V ultrafast, high efficiency diode in a TO-220 package. In a flyback with such a wide range of AC mains, the output diode has very high peak currents at low line and heavy loads and has reverse voltage stress at high line. C115 and C116 were chosen for capacitance value, a maximum impedance of 18 mΩ @100 KHz, and a minimum ripple current of 2.9 A @100 KHz, 105° C. The output capacitors are made with advanced foil technology and exhibit very low impedance per volume compared to similar capacitors. C117 is a high frequency bypass capacitor. R121 is a minimum load and dampening resistor for the +24 VDC. R121 is derated approximately 50% from maximum rating.

C200 provides a delay for the power reset circuit. R202 and R203 set the undervoltage threshold for the power reset circuit at approximately +15 VDC for both U200 and U201. The power reset circuit-senses the input voltage at pin 3 and the feedback voltage at pin 11. The power reset circuit pulls the output at pin 4 low if the input voltage drops below approximately +15 VDC or the feedback voltage drops below +4.9 VDC. The reset output is an open-collector that is connected to POWER.FAIL. POWER.FAIL is a low active signal that indicates the PS has lost control and power has failed. R201 is a pull-up for the POWER.FAIL signal. SB201 is a SMT ferrite bead to suppress EMI between the control and power ground of the regulator.

The feedforward characteristic is completely contained internal to the L4975 and does not require any external components. The pulse-by-pulse current limit is also contained internally and is set at 6.3 amperes +/−10%. C205, C206, and R205 form the error amplifier compensation circuit.

Although a specific preferred embodiment of the present invention has been described in the detailed description above, the description is not intended to limit the invention to the particular forms or embodiments disclosed herein, since they are to be recognized as illustrative rather than restrictive and it will be obvious to those skilled in the art that the invention is not so limited. The invention is declared to cover all changes and modifications of the specific examples of the invention herein disclosed for purposes of illustration, which do not constitute departures form the spirit and scope of the present invention as defined by the appended claims.

What is claimed is:

1. An all-ranging DC output uninterruptible switched mode power supply of off-line isolated flyback topology comprising:

a switched mode power supply means including a transformer having primary and secondary windings and an isolated flyback converter including a main power switch; said transformer storing energy in its primary when the switch is conductive and transferring energy to the secondary winding of said transformer when nonconductive;

output filter means to rectify and filter the transformer output pulses to produce DC voltages;

pulse-width modulated control circuit means to sense the output voltage level and adjust the duty cycle of the power switch to control the output voltage by accepting feedback from the output, comparing the feedback to a set point and generating an error signal which provides the basis for modulating the width of the output pulse by adjusting the conduction time of the power switch;

a pulse-width modulated control circuit start-up circuit comprising a resistor and first and second capacitors, with a start-up time delay being a function of an RC time constant formed by a resistance of the resistor and a capacitance of the second capacitor; and snubber circuit means for permitting the slow decay of current in the transformer, the snubber circuit means including said second capacitor that stores sufficient energy to power the pulse-width modulated control circuit when charged by current from the transformer during a flyback period of the transformer, wherein the capacitance of the second capacitor is at least ten times greater than a capacitance of the first capacitor such that the second capacitor stores said sufficient energy, wherein the capacitance of the second capacitor is such that the start-up time delay is maintained at a reasonable value.

2. The switched mode power supply of claim 1, wherein the capacitance of the first capacitor is approximately 20 µF and the capacitance of the second capacitor is approximately 470 µF.

3. The switched mode power supply of claim 2, wherein the resistance of the resistor is approximately 47 K ohms.

* * * * *